March 18, 1947. H. J. STEWART 2,417,715
DISK SPRING ASSEMBLY
Filed Aug. 10, 1945

INVENTOR
Howard J. Stewart
ATTORNEYS

Patented Mar. 18, 1947

2,417,715

UNITED STATES PATENT OFFICE 2,417,715

DISK SPRING ASSEMBLY

Howard John Stewart, Apollo, Pa., assignor to Union Spring and Manufacturing Co., New Kensington, Pa., a corporation of Pennsylvania Application August 10, 1945, Serial No. 610,027

5 Claims. (Cl. 267—1)

This invention is for a self contained spring assembly utilizing a plurality of reversely cambered disks as the principal resilient element, and is for an assembly of this character in which provision is made for holding the disks centered in such manner that no clearance beyond the end of the assembly is required.

Spring assemblies, using oppositely cambered disks, known as Belleville, are not uncommon. Usually several pairs of reversed disks are confined between end members with a central pin or rod extending between the two end members, to hold the disks in place, one of the end members being slidable on the pin so that when the spring is compressed, the rod or pin projects beyond the end member, requiring clearance space beyond the end of the assembly.

The present invention provides an assembly, which in the same space as a corresponding conventional assembly, may compress without requiring any clearance space beyond the ends of the assembly. This is accomplished by utilizing a spiral spring for centering most of the disks in the assembly.

The invention may be readily understood by reference to the accompanying drawing in which.

Figure 2:
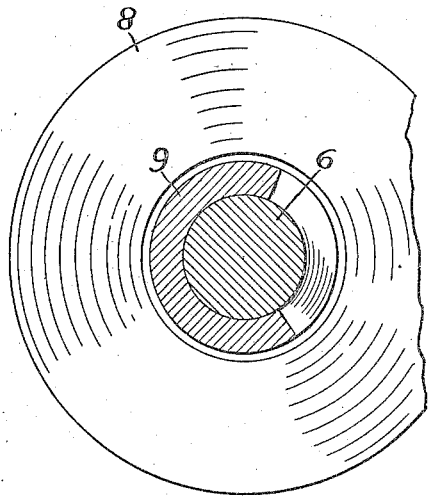
Fig. 2 is a transverse vertical section in the plane of line II—II of Fig. 1.
Figure 1:
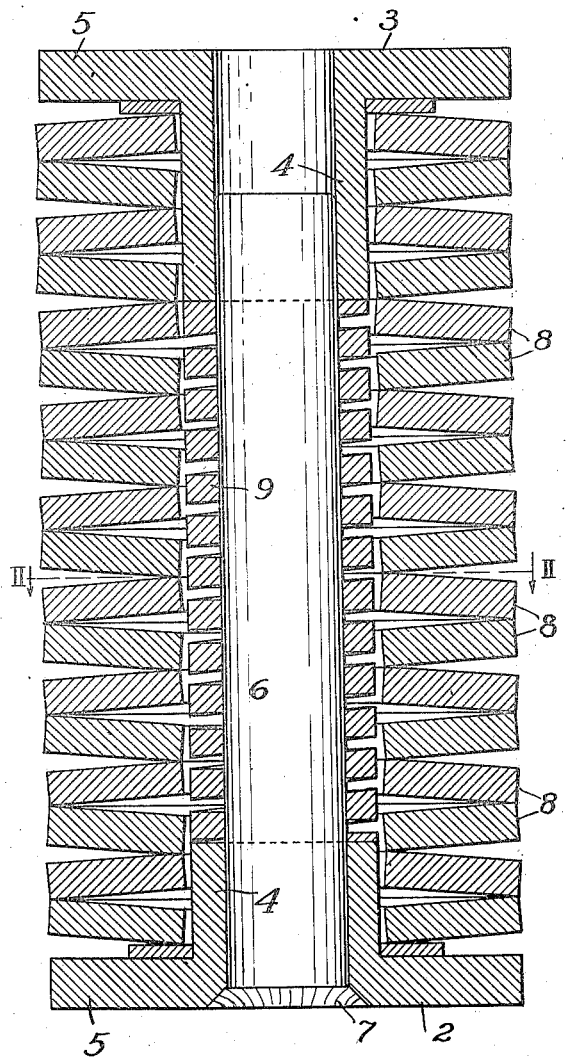
Fig. 1 is a vertical longitudinal section through a Belleville spring assembly embodying my invention.

In the drawing, there are two end members 2 and 3, each having a sleeve portion 4 and a flange 5 at the outer end. The end member 2 has a central pin or post 6 passing therethrough and which may have an enlarged head portion 7 at one end, and may be welded or otherwise secured to the end member 2. The other end of the post 6 is slidably received in the sleeve portion 4 of the other end member, 3.

Confined between the flanges of the two end members are a plurality of pairs of reversely cambered metal disks 8, these disks being centrally apertured, as is customary in Belleville spring assembly.

While all of the disks have holes of the same diameter therethrough, only some of the disks are centered on the sleeve portions of the end member. To center the others and keep them in line, a conventional helical spring 9 is interposed between the sleeve portion 4, about the rod or post 6, with the inside diameter such as to fit about the post and the outside diameter about equal to the outside diameter of the sleeves 4.

The spring is preferably formed of square stock so that its exterior presents a satisfactory supporting surface for the surrounding disks.

The post itself is of a length less than the full length of the assembly, so that when the spring assembly is fully compressed, the end of the post will not project beyond the end member 3.

The spring thus provides a longitudinally compressible centering element for the surrounding disks. When the spring is compressed, the end members move together, tending to flatten the Belleville disks. At the same time the compressible sleeve or spring 9 is also compressed or shortened. The spring assembly can compress its full limit without causing the post to project beyond the assembly, it being possible to make the post of less length than the spring assembly because of its telescoping engagement with the sleeve 4 of the end member 3. If the spring 9 were not provided the sleeves 4 could not be used because the post 5 would have to be of a diameter throughout the full distance between the end members to center the disks.

While I have illustrated and described a preferred embodiment of my invention, it will be understood that the same may be modified in various ways within the scope of the following claims.

I claim:

1. A cambered disk spring assembly comprising opposed end members, one of which has an inwardly turned sleeve, a center post on the other member projecting into but only part-way through the sleeve, a helical spring fitted about the post and having an outside diameter equal to that of the said sleeve, and a plurality of cambered disks between the end members centered on the sleeve and spring.

2. A cambered disk spring assembly comprising opposed end members, one of which has an inwardly turned sleeve, a center post on the other member projecting into but only part-way through the sleeve, a helical spring fitted about the post and having an outside diameter equal to that of the said sleeve, and a plurality of cambered disks between the end members centered on the sleeve and spring, the second end member also having an inwardly turned sleeve portion of the same diameter as the first, the helical spring being confined between the sleeve portions of the two end members.

3. A Belleville type of spring assembly wherein a plurality of cambered spring disks are confined between end members with a central post on one member telescopically fitted into the other end member, characterized by a helical spring about the post for centering some of the disks between the end members.

4. A cambered disk spring assembly comprising opposed end members, one of which has an inwardly turned sleeve, a center post on the other member projecting into but only part-way through the sleeve, a helical spring fitted about the post and having an outside diameter equal to that of the said sleeve, and a plurality of cambered disks between the end members centered on the sleeve and spring, the said helical spring being formed of square stock.

5. A Belleville type of spring assembly comprising two flanged end members with central sleeve elements, a post slidable in one of the sleeve elements engaged also in the other sleeve element and of an overall length less than the normal overall length of the assembly, a helical spring fitted about the post having an outside diameter equal to that of the sleeve elements and a plurality of cambered disks confined between the end members and centered about the sleeve elements and helical spring.

HOWARD JOHN STEWART.